April 22, 1969     ÅKE SILVANDER     3,439,604
APPARATUS FOR PRODUCING ARTICLES FROM A
PLASTIC OR FLUID SUBSTANCE
Filed Dec. 23, 1966
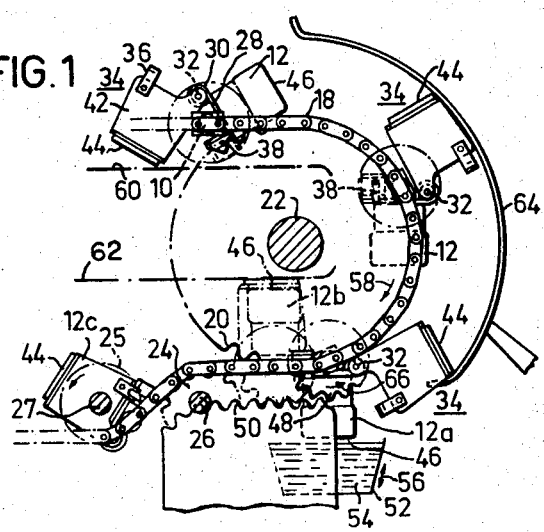
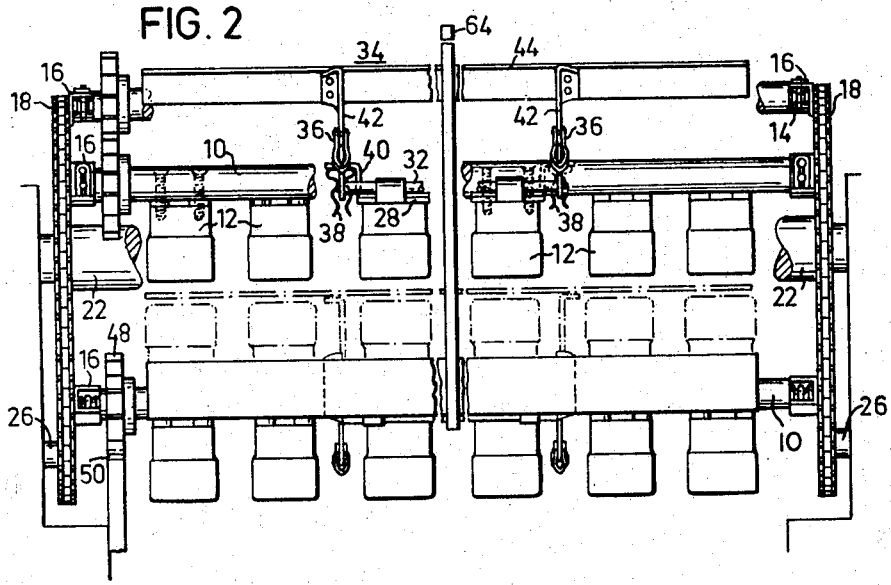
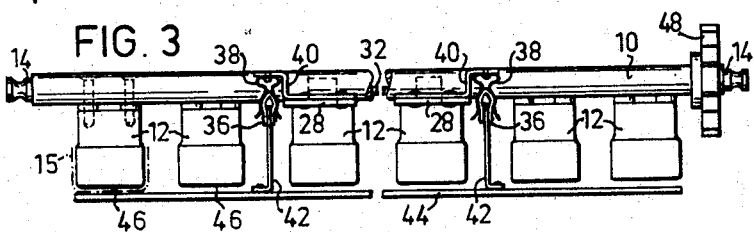
INVENTOR.
ÅKE SILVANDER
BY
Young + Thompson
ATTYS.

3,439,604
APPARATUS FOR PRODUCING ARTICLES FROM A PLASTIC OR FLUID SUBSTANCE

Åke Silvander, Duvnas Udde 17, Saltsjo-Duvnas, Sweden
Filed Dec. 23, 1966, Ser. No. 604,326
Claims priority, application Sweden, Dec. 29, 1965, 16,923/65
Int. Cl. A47j *43/04;* A21c *9/00*
U.S. Cl. 99—431      4 Claims

ABSTRACT OF THE DISCLOSURE

The apparatus to be specified hereinafter is particularly for producing certain types of pastry-work by using forming members mounted on endless conveying members adapted to move said members to immerse them into a fluid or plastic mass or dough in a trough so that said mass or dough adheres to the forming members, which are then guided to be turned up. The dough is baked in hot oil while being carried by the forming members, from which they will then be removed. Important is the turning operation of the forming member after the dough has adhered, since the dough is distributed thereby on said members and held in a corrected position during continued operation.

---

This invention relates to an apparatus for the mass production of articles from a plastic or fluid substance or mass. It is a special object of the invention to provide an apparatus for producing certain types of pastry-work by simple mechanical means on a large scale.

In the apparatus to which the invention refers a plastic or fluid substance is put on or applied to a forming member mounted, together with similar forming members, on a carrier supported by endless conveying members by means of which the carrier and the forming members are transported to a substance-applying station and therefrom to a station in which the substance is converted, for instance into a solid state. In its broadest aspect the invention is characterized in that the forming members are adapted by means of the conveying members to be moved into a position above a trough or other vessel which contains said substance in which the forming members are immersed. This arrangement yields the advantage that no matrix for moulding the substance around the forming member is necessary.

Advantageously, guide members may be located after the applying station as viewed in the direction of movement of the conveying members, which guide members are adapted under the action of the movement of the conveying members to turn the forming members from their immersion positions into positions in which the immersed portion of the forming members are facing upwardly.

The carrier may be provided with a holder which is movable with respect to the carrier and adapted after application of the substance to retain the substance on the forming member while the substance is converted into the desired consistency. The holder may also serve other purposes in addition to retaining the substance on the forming member. The holder may have a forming surface which gives part of the substance taken up by the forming member a certain, for instance plane external shape which for instance forms a bottom surface of the article to be formed. The forming surface of the holder may further be devised to make a marking on the article. The holder may also be provided with dyes effecting a desired external shape of the formed article.

Additional aspects of the invention and advantages thereof will appear from the following description of an embodiment illustrated in the annexed drawings. FIG. 1 is a lateral elevation of the main portion of the apparatus. FIG. 2 is an end elevation viewed from the right in FIG. 1. FIG. 3 is an elevation of a carrier for a plurality of forming members and a common holder for these members.

Mounted on a carrier which, in the embodiment exemplified, substantially consists of a shaft 10 is a row of forming members 12 adapted to form the articles to be produced from a plastic or fluid mass or substance. The journals 14 of the shaft 10 are mounted for rotation in bearings 16 which are secured to endless conveying members exemplified by chains 18. The chains run over sprockets which drive the chains and guide the chains and the shafts mounted in the bearings 16 such that the forming members 12 can be transported to different stations, namely, a substance-applying station, a station for converting the substance applied into solid state, and a station for removing the formed articles from the forming members. In FIG. 1 there is only shown one large sprocket 20 keyed onto a driven shaft 22 which can drive the sprocket 20 and the chains continuously or stepwise, and there is also shown a pair of idle sprockets 24, 25 which are rotatably mounted on stationary axes 26 and 27, respectively. Such a large sprocket and two small sprockets are provided for each conveyor chain 18.

Each forming member 12 is mounted on a plate 28 mounted on the shaft 10. Two of these plates have bearings 30 for a pivot 32 about which a holder 34 can be turned. The holder carries a locking member 36 adapted to be engaged by a spring clip 38 which is secured to an angle piece 40 on the plate 28. As shown in FIG. 2, there are preferably provided two locking members 36 and two spring clips 38. The locking member 36 is firmly connected with a holder arm 42, and the arms 42 carry a forming bar 44 which may be provided with dyes. The forming bar 44 is intended to be moved under the end surface 46 of the forming member 12 into thte position shown in FIG. 3 in which the line 15 denotes the outline of a formed article. The side of the forming bar which faces the end surfaces 46 of the forming members is shaped such as to give the mass taken up by the forming member a certain external shape at the end or bottom surface. While this side of the forming bar may be simply plane, it may be provided with impressions or projections for marking or forming the outside of the article.

Secured to one end of the shaft 10 is a gear wheel 48 for engagement with a stationary rack 50, FIG. 1. As a result thereof the shaft 10 together with the forming members will be positively turned in its bearings on the chains 18 at a certain place during the movement of the chains past the various stations. An immersing station is shown at the bottom of FIG. 1. In this station the end surface 46 of a forming member 12a is facing downward toward a trough 52 which contains a plastic or fluid mass 54. The trough is intended to be lifted and lowered as indicated by the double arrow 56. Due to the fact that the gear wheel 48 rolls on the rack 50 while the conveyor chains 18 are advancing in the direction of the arrow 58 the forming member in the position 12a, aft application thereto of the mass, will be turned upwards into the position 12b indicated by chain-dotted lines in which the bottom surface 46 of the forming member is facing upwards.

The apparatus also comprises stationary guide rails which, during transportation, keep the forming member and holders 42 in correct mutual position. The apparatus comprises an upper horizontal guide rail 60, a lower horizontal guide rail 62 and an arcuate guide rail 64.

The mode of operation of the apparatus described is substantially as follows. A plurality of parallel and preferably equally spaced shafts 10 with appertaining rows of forming members extend between the conveyor chains 18. At the top of FIG. 1 there is shown such a shaft together with forming members and holders on its way to the large sprocket 20 on the driving shaft 22. The forming bar 44 of the holder 34 is dragging along the guide rail 60 and the end surface 46 of the forming member 12 is facing obliquely upwardly and forwardly. The forming members and the holders are substantially in the same mutual positions after the shaft 10 has been moved by means of the chains 18 onto the sprocket 20. This is due to the fact that the holders 34 are prevented from turning about the pivots 32 toward the forming members 12 by the arcuate guide rail 64 along which the forming bar 44 is sliding. When the forming member has arrived at the immersing station in the downwardly directed position indicated at 12a in FIG. 1 the forming bar 44 of the holder 34 is still in engagement with the guide rail 64. The trough 52 together with the mass 54 which may be a dough of suitable consistency is now lifted to such an extent that the forming member will be surrounded a desired degree by the mass which adheres to the forming member. The trough 52 is then lowered again, whereupon the shaft 10 together with the forming members 12, due to the engagement of the gear wheel 48 with the rack 50, will be turned counter-clockwise as indicated by the arrow 66. At the same time the holder 34 is disengaged from the guide rail 64 so that it can turn about the pivot 32 in the direction toward the forming members. Because of the opposite turning movements of the forming members and the holder the locking member 36 comes into engagement with the spring clip 38, and the forming bar 44 will be positioned opposite the end surfaces 46 of the forming members in the position indicated at 12b in FIG. 1. In this position the mass taken up by the forming members will be uniformly distributed on the desired surface of the forming members, and the forming bar 44 provides for an external plane surface of the mass on the end surface 46. Upon continued movement of the conveyor chains the forming members and the holder will be turned together counter-clockwise about the shaft 10 so that the forming bar 44 will be turned downwards. In a position 12c to the left at the bottom of FIG. 1 a row of forming members is turning downwards under the action of gravity as the shaft 10 is free to rotate upon the disengagement of gear wheel 48 from rack 50.

After the row of forming members has been turned downward again it is moved to a station in which the mass applied is converted into solid state. This station may be an oil bath or an oven in which the mass is baked. Alternatively, the station may be a cooling device in which the mass is solidified. The finished articles are then manually or automatically removed from the forming members. In the bath, oven or cooling device the forming members are subjected to such a higher or lower temperature that they are able, after having returned to the substance-applying station, in the required degree to take up and retain mass to be formed.

What I claim is:

1. An apparatus for producing articles from a plastic or fluid substance comprising endless conveying means, carriers mounted on the conveying means, forming members supported by the carriers, and a trough, said conveying members being adapted to move said forming members into a position above the trough and to immerse the forming members into said substance contained in said trough, and a holder mounted on the carrier to be movable with respect to the carrier and adapted after application of the substance to retain the substance on the forming member while the substance is converted into the desired consistency.

2. An apparatus as claimed in claim 1, characterized in that the holder has a forming surface which gives part of the mass taken up by the forming member a certain external shape.

3. An apparatus as claimed in claim 1, characterized in that the holder has a forming surface devised to make a marking on the article.

4. An apparatus as claimed in claim 1 and further comprising a guide for the holder adapted to keep the holder out of engagement with the forming member while the substance is applied to said member.

References Cited

UNITED STATES PATENTS

| | | | |
|---|---|---|---|
| 522,797 | 7/1894 | Metcalf | 99—431 |
| 817,408 | 4/1906 | Wall | 118—426 |
| 1,585,880 | 5/1926 | Schnell | 118—426 X |
| 1,776,006 | 9/1930 | Nairne | 118—421 |
| 1,781,411 | 11/1930 | Reiber | 99—431 X |
| 1,991,118 | 2/1935 | Raiche. | |
| 2,155,995 | 4/1939 | Robb | 118—30 X |
| 2,417,472 | 3/1947 | Dorff | 118—426 X |
| 2,786,430 | 3/1957 | Robbins et al. | 99—431 X |
| 2,962,985 | 12/1960 | Castronuovo | 99—431 X |
| 3,105,776 | 10/1963 | Weyhmueller | 118—426 X |

WALTER A. SCHEEL, *Primary Examiner.*

JOHN M. NEARY, *Assistant Examiner.*

U.S. Cl. X.R.

99—427; 107—8.4; 118—30